_United States Patent_ [19]

Hopper

[11] Patent Number: 4,590,998
[45] Date of Patent: May 27, 1986

[54] TUBING VALVE

[76] Inventor: Bobby E. Hopper, Rte. 1, Box 1660, Pearland, Tex. 77584

[21] Appl. No.: 536,177

[22] Filed: Sep. 27, 1983

[51] Int. Cl.[4] ............................................. E21B 34/12
[52] U.S. Cl. ................................... 166/331; 166/152; 166/334; 251/347
[58] Field of Search ................ 166/334, 331, 330, 325, 166/323, 316, 312, 152, 142, 128, 332, 146; 251/341, 344, 347, 348

[56] References Cited

U.S. PATENT DOCUMENTS

| | | | |
|---|---|---|---|
| 2,083,714 | 6/1937 | Keeler | 166/331 |
| 2,121,268 | 6/1938 | Shaffer | 166/152 |
| 2,128,716 | 8/1938 | Smith | 166/152 |
| 2,196,664 | 4/1940 | Kofahl | 166/128 |
| 2,378,469 | 6/1945 | Denton | 166/128 |
| 2,569,437 | 10/1951 | Baker | 166/146 |
| 2,850,102 | 9/1958 | Brown | 166/331 |
| 2,944,607 | 7/1960 | Baker | 251/347 |
| 3,094,306 | 6/1963 | Conrad | 251/344 |
| 3,391,743 | 7/1968 | Bateman | 166/331 |
| 3,765,487 | 10/1973 | McEver | 166/152 X |
| 4,027,732 | 6/1977 | Perkins | 166/312 |

_Primary Examiner_—James A. Leppink
_Assistant Examiner_—Hoang C. Dang
_Attorney, Agent, or Firm_—Browning, Bushman, Zamecki & Anderson

[57] ABSTRACT

Disclosed is a tubing valve which may be used for selectively closing passages through tubular members and the like. The valve includes first and second housing members which may be mutually moved and which carry a latch assembly for limiting such movement between a first configuration and a second configuration. Each of the housing members further includes a valve member wherein the two valve members may be in mutual sealing engagement with the housing members in the first configuration. The valve members are not in sealing engagement with the housing members in the second configuration, thereby permitting fluid communication, for example, through the tubular passage. At least one of the valve members comprises a piston in sliding, sealing engagement with the corresponding housing member whereby fluid pressure within the tubular passage urges sealing engagement between the first and second valve members when the housing members are in the first configuration. A biasing spring ensures that, when the housing members are moved into the first configuration, the valve members mutually seal.

15 Claims, 7 Drawing Figures

TUBING VALVE

BACKGROUND OF THE INVENTION

1. Field of the Invention

The present invention pertains to techniques for selectively opening and closing flow passages. More particularly, the present invention is related to apparatus and methods for selectively closing flow passages along tubular members, and finds particular application in wells and the like wherein tubing strings, for example, must be selectively closed to permit various operations on the wells.

2. Description of Prior Art

A variety of operations necessary for proper completion and maintenance of a well is carried out using a tubing string lowered into the well, and which tubing string must at one time or another be closed at a location within the well. Such operations, for example, include washing the well perforations in the casing, formed at a formation from which production is anticipated, prior to gravel packing the well at that location, or at which fluid is to be injected as in the case of an acidizing operation, for example. In such instances, it has been the practice to utilize a ball catcher seat within the tubing string below the level of the wash tool or acidizing tool. Then, with the tool at the level of the formation of interest, a ball is circulated down the tubing string to establish sealing engagement with the catcher seat, whereupon fluid is pumped into the tubing string which is now closed by the ball and seat. Increased pressure within the tubing string may be utilized to operate the wash tool, for example, thus allowing the fluid pressure to emerge from the wash tool into the surrounding annular region within the casing of the well to carry out the desired operation. To reopen the tubing string, the ball must be reverse pumped out of the tubing string. Where the tubing string must simply be repositioned without reopening, a circulating valve may be included above the wash tool, for example.

A ball-and-seat arrangement to close the tubing string may be utilized with a variety of other tools to carry out hydraulic setting of such tools. For example, hydraulically set packers may be operated with such a ball-and-seat closing device, after which, to reopen the tubing string, the ball must either be reverse pumped out of the well or otherwise disposed of.

In addition to the inconvenience of having to reverse pump a ball closure device from a well, such a device presents other problems. For example, where a wash tool is to be positioned within a well at the level of perforations in the casing, several attempts at locating the wash tool at the proper depth may be required. When such a tool is set, it sealingly engages the surrounding casing at locations above and below the wash outlets in the tool so that the washing, or acidizing, fluid may be confined longitudinally within the casing at the depth of interest. The operator at the surface can detect whether the tool is located at the perforations by observing the fluid pressure in the tubing string. If the fluid pumped into the tubing string is free to move through perforations in the casing into the surrounding formation, the fluid pressure may drop. If the tool is not properly placed and no perforations are available in the surrounding casing, the fluid pressure will not be permitted to drop by means of fluid communication into the surrounding formation. Then, the operator must release the fluid pressure and move the tubing string with wash tool attached. To so move the tubing string, if no flow valve is available, the operator must pump the ball out of the tubing string to allow fluid movement along the tubing string. This can be an expensive and time consuming operation. In any event, if the tubing string is to be reopened for fluid flow therethrough below the wash tool, the ball must be removed from the tubing string.

It is desirable and advantageous to provide a closure valve that is selectively operable for opening and closing passages along tubular members. In particular, such a closure valve would eliminate the need for a ball and catcher seat for use in tubing strings as described above, for example, and would permit the reopening of the flow passage along such a tubing string after operations requiring the closure of the flow passage are completed.

SUMMARY OF THE INVENTION

The present invention provides a method and apparatus for selectively closing a passage in a tubular member, for example. A closure valve is provided including first and second valve members or elements. A seal member is carried by one of the valve elements, which are selectively movable between a first configuration in which the seal member provides sealing engagement between the valve members to close a passage through the first valve element, and a second configuration in which the passage through the first valve element is not so closed.

The first and second valve elements may be included within first and second housing members, respectively, wherein the housing members are selectively mutually movable between first and second positions. The housing members each include a passage which may communicate with the passage through the tubular member to be selectively closed. With the housing members in the first position, the valve elements assume the first configuration to close the passage combination, while the valve elements are in their second configuration with the housing members in their second position.

A latch assembly is carried by the first and second housing members to limit their mutual movement between the first and second positions. Further, the latch mechanism may releasably lock the first and second housing members in the first position.

The first valve element including a passage therethrough provides a piston slidably sealed to the first housing member so that, in the first configuration, the first valve element is urged into sealing arrangement with the second valve element by fluid pressure within the passage of the first valve element and the first housing member in communication therewith. The second valve element may be in the form of a plug for so closing the passage to the first valve element in the first configuration by sealing engagement with that valve element.

A biasing device, such as a coil spring, may be carried by the first housing member to urge the first valve element into such sealing engagement with the second valve element when the first and second housing members are in the first position. The biasing apparatus provides a resilient-type sealing linkage between the first and second valve elements in the first configuration where the seal between the two valve elements is provided by a resilient face seal member.

Where the first and second housing members cooperate to provide a generally tubular housing assembly, the latch device may be in the form of a Jay-latch which is selectively operable by relative movement between the first and second housing members. For example, one of the first or second housing members may be rigidly connected to a tubing string, while the other housing member carries a resistance mechanism, such as one or more drag springs. Then, manipulation of the tubing string to rotate the housing member rigidly attached thereto may release the Jay-latch from locking configuration as movement of the other housing member is retarded by the resistance device. Thereafter, longitudinal movement between the housing members, again effected by movement of the tubing string combined with retardation of motion of the other housing member by the resistance device, effects shifting of the Jay-latch from one configuration to another. Subsequent rotary motion between the first and second housing members may lock the housing members in the new configuration. Actual structure of the latch mechanism dictates the type of manipulation required to operate the latch.

A tubing valve according to the present invention may be joined in a tubing string whose interior passage communicates with the passage through the housing assembly. After the valve is positioned as desired, the tubing string may be manipulated as described above while the resistance device impedes rotary movement of the attached housing member to unlock the latch mechanism. Thereafter, longitudinal movement of the tubing string may effect opening or closing of the valve as needed, and rotary motion may again lock the valve in either configuration.

The present invention provides a valve with a passage therethrough which may be selectively opened or closed, such processes being carried out repeatedly as desired. Further, since the first valve member is constructed as a piston so that increased fluid pressure on that side of the seal between the valve members in the closed, first configuration urges yet tighter sealing engagement between the valve elements, the present invention is particularly suitable for applications in which high fluid pressures are to be applied within the tubing string passage on that side of the valve seal.

DETAILED DESCRIPTION OF PREFERRED EMBODIMENTS

Figures 1, 3:
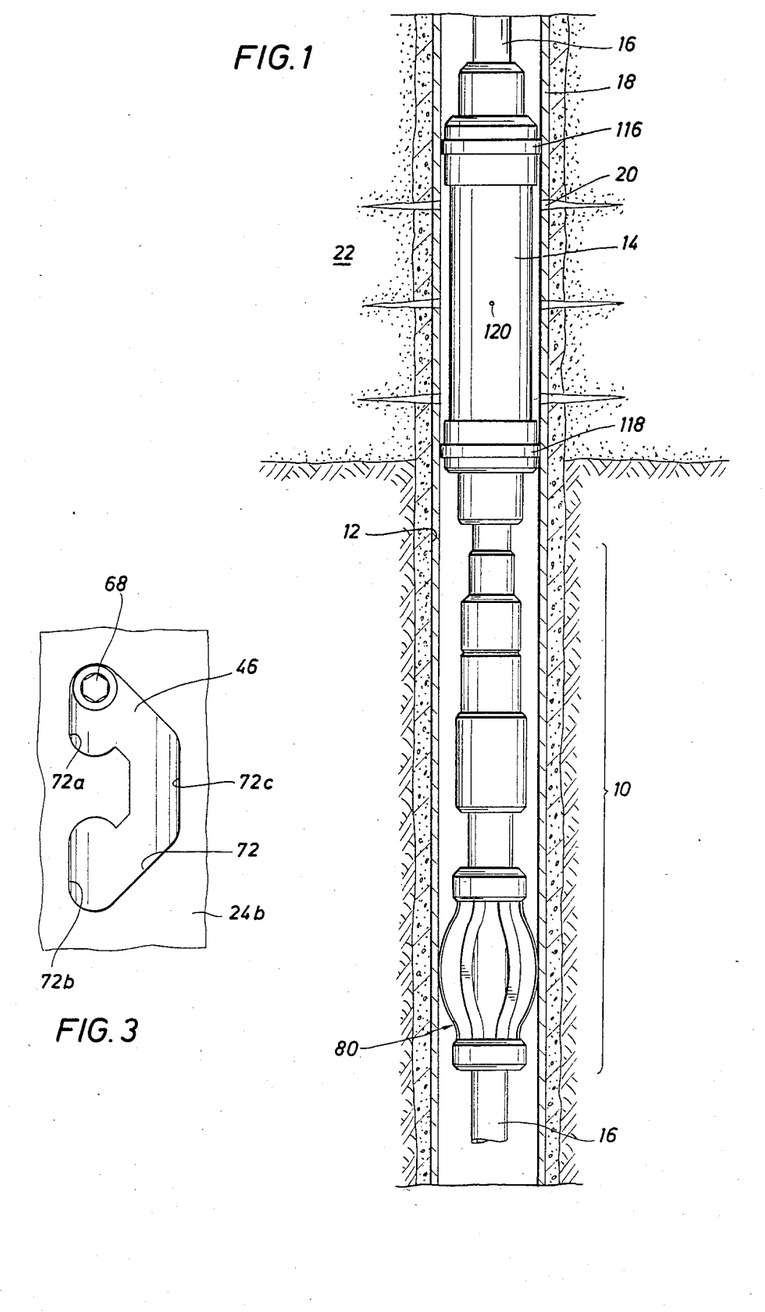
FIG. 1 is a cutaway view of a valve according to the present invention included in a tubing string, positioned within a well below a wash tool.
FIG. 3 is a fragmentary view of the latch mechanism of the valve of FIGS. 2A and 2B.

In FIG. 1, a valve according to the present invention is shown generally at 10 positioned within a well bore 12. The valve 10 is suspended below a wash tool 14 or the like, in line on a tubing string 16 which may continue to the surface of the well, and which may be continued below the valve as illustrated. The well bore 12 is lined with casing 18 which is cemented in place as shown, and which has been pierced by perforations 20 at the depth of a formation 22 of interest.

Figures 2A, 2B:
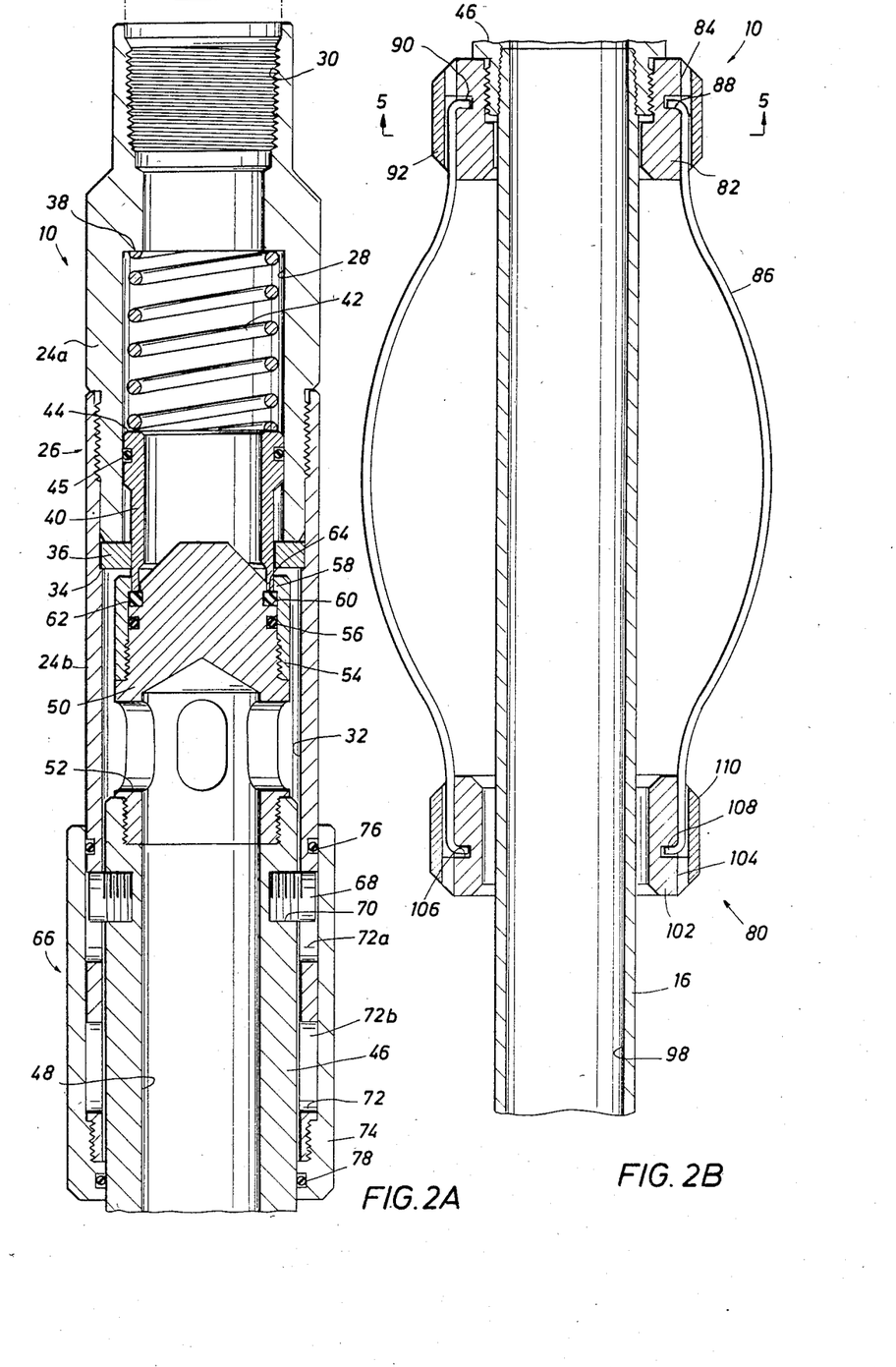
FIGS. 2A and 2B combined provide a side elevation in partial section of a valve according to the present invention, FIG. 2A illustrating the upper portion of the valve and FIG. 2B showing the lower portion.

Details of the construction of the valve 10 may be appreciated by reference to FIGS. 2A and 2B, the latter forming a lower continuation of the former. The valve 10 includes an upper, or first, body or housing member constructed of two generally tubular sections 24a and 24b (hereafter sometimes referred to collectively as 24a and b) joined together at a fluid-tight threaded connection shown generally at 26. The upper section 24a defines a structured, internal passage 28 therethrough, which ends toward the top of the section in a threaded box 30 for fluid-tight connection to a tubing string section or other tools, for example.

The lower section 24b also defines an internal passage 32, which features an upwardly facing, internal annular shoulder 34. When the housing sections 24a and 24b are so threadedly joined as shown, a washer 36 is positioned between the shoulder 34 and the bottom face of the upper section 24a, which may be shorted to ensure a complete fluid-tight connection at 26. The washer forms a radially-inwardly extending flange of the first housing member 24a and b.

The upper section internal passage 28 features a downwardly-facing, internal annular shoulder 38. A generally tubular first valve member or element 40 is located within the passage 28, and is biased downwardly, as viewed in FIG. 2A, by a coil spring 42 generally compressed between the shoulder 38 and the upper annular face 44 of the valve element. An O-ring seal 45 in an appropriate groove in the outside surface of the first valve member 40 provides sliding, sealing engagement between the valve member and the first housing member 24a and b.

The valve 10 also includes a second, or lower, body or housing member 46 which also defines an internal passage 48.

A second valve member or element 50 is threadedly connected to the top of the second housing member 46, and features a frustoconical top end serving as a plug as discussed hereinafter. The second valve element 50 also includes a plurality of ports 52 for communication between the internal passage 48 of the second housing member 46 and the area external thereto. A generally tubular thimble 54 encircles the second valve element 50 and is threadedly connected thereto. An O-ring seal 56 residing in an appropriate annular groove in the second valve element 50 provides sealing engagement between the thimble 54 and the second valve element. An internally-directed flange 58 of the thimble 54 cooperates with an annular groove 60 about the second valve element 50 to provide an annular holder for a resilient face seal 62. The bottom annular edge 64 of the first valve element 40 may be received between the thimble flange 58 and the frustoconical region of the second valve element 50 to seat against the face seal 62, to provide sealing engagement between the first and second valve elements.

A latch mechanism connecting the second housing member 46 with the lower section 24b of the first housing section is shown generally at 66. The latch mechanism 66 is generally of the form known as a Jay-latch, wherein a pin carried by one member is received within a structured slot as part of another member for limited relative movement between the two members. The present latch mechanism 66 includes two such devices, positioned on opposite sides of the housing members and operable in unison, although, it will be appreciated, one such mechanism would suffice. In particular, a pin 68 in the form of a socket head bolt is threadedly engaged within an appropriately threaded bore 70 in the side of the second housing member 46 so that the head of the pin extends radially outwardly to be received within a structured slot 72 in the lower section 24b of the upper housing member. The slot 72 and the pin 68 are covered by a sleeve 74 threadedly connected to the lower end of the first housing member 24a and b and forming the bottom end of the housing. An O-ring seal 76 carried in an appropriate groove in the first housing member provides fluid-tight contact between that housing member and the sleeve 74 above the latch slot 72. An O-ring seal 78 in an appropriate groove on the interior side of the sleeve 74 provides sliding, sealing engagement between the lower end of the sleeve and the second housing member 46.

As may be appreciated from FIG. 3, which shows a side elevation of the fragment of the first housing member lower section 24b containing the slot 72 with the pin 68, but with the sleeve 74 removed, the slot 72 is generally C-shaped, with an upper leg 72a and a lower leg 72b separated by an intermediate segment 72c. Pin 68 is confined to the slot 72, but is generally free to move about within the slot as the first housing member 24a and b moves relative to the second housing member 46. It will be appreciated that such movement to cause the pin 68 to be moved between the legs 72a and 72b of the slot 72 involves both relative longitudinal and rotational movement between the two housing members. However, no relative movement between the housing members is permitted other than that which may be accompanied by movement of the pin 68 within the slot 72.

A like pin and slot combination, identical to that of the pin 68 and slot 72 described above and illustrated in FIG. 3 is located on the opposite side of the valve 10 as viewed in FIG. 2A. However, the two pin-and-slot mechanisms operate in unison and in the same manner so that the second combination need not be further described nor illustrated herein.

Figures 4, 5:
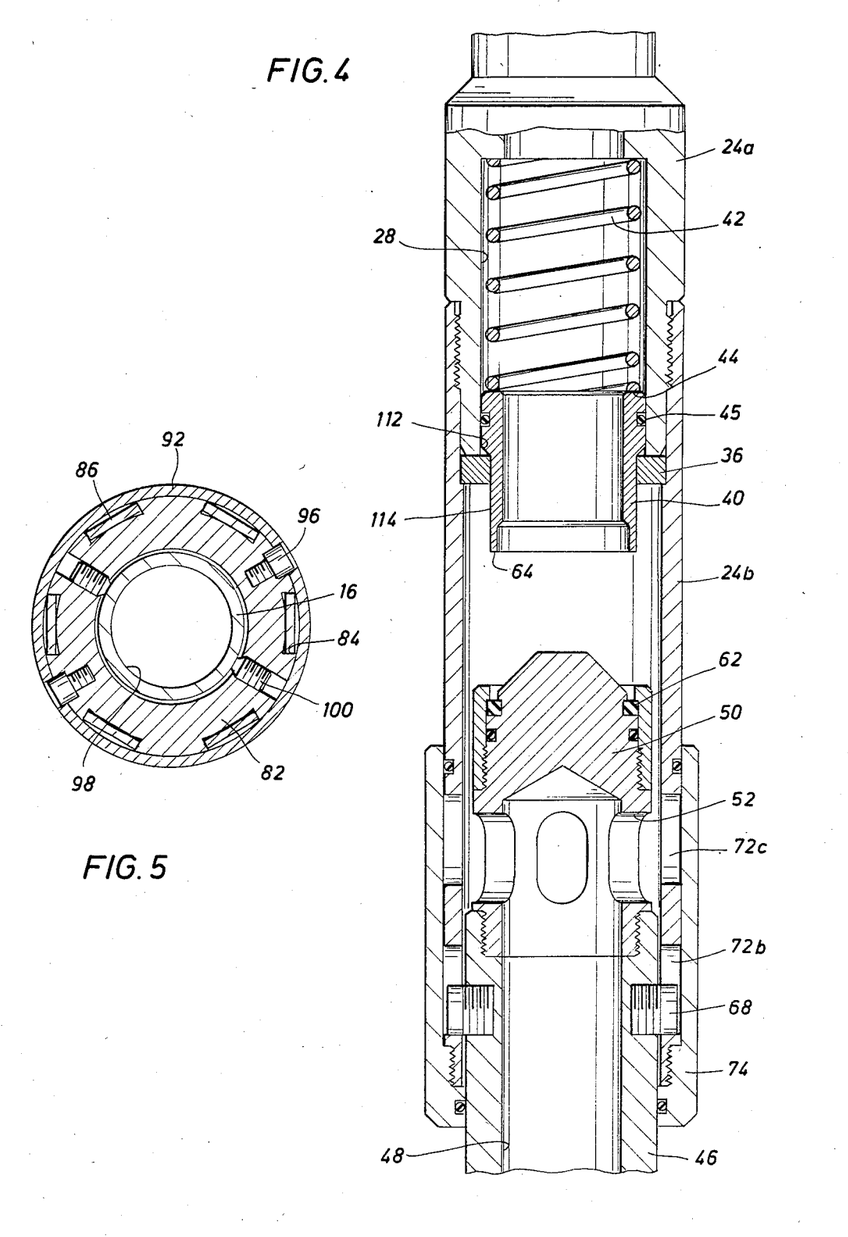
FIG. 4 is a view of the upper portion of the valve as shown in FIG. 2A, but with the valve in the open configuration.
FIG. 5 is a transverse cross section taken along line 5—5 of FIG. 2B.

A drag spring assembly shown generally at 80 in FIG. 2B is connected to the bottom of the second housing member 46 as illustrated. An upper mounting ring 82 is threadedly engaged to the bottom of the second housing member 46, and receives in a plurality of slots 84 the upper ends of a like number of bow springs 86. Across the base of each of the longitudinally-extending slots 84 is a transverse groove 88 which receives the L-shaped end 90 of the corresponding bow spring 86. A retainer ring 92 circumscribes the ring 82 and serves as a clamp over the ends of the bow springs 86 to retain the bow springs latched in place within the combination of rings 82 and 92. FIG. 5 shows further details of the slots 84 as well as the manner in which the rings 82 and 92 are maintained in place.

As may be seen by reference to FIG. 5, one or more set screws 96 (two are shown) extend through appropriate holes in the retainer ring 92 and are threadedly engaged in appropriately threaded bores in the inner ring 82 to maintain the spring retainer ring 92 in place about the inner ring and over the ends of the bow springs 86. The tubing string 16 supporting the valve 10 may continue below the valve, first in a sub threaded to the bottom of the second housing member 46 (see FIG. 2B) whereby the longitudinal passage 98 through the tubing string may communicate with the internal passage 48 of the second housing member. The threaded connection between the tubing string 16 extensions below the valve and the second housing member 46 is fluid-tight. To ensure against unintended release of that connection, one or more set screws 100 (two are shown) are threadedly engaged in appropriately threaded bores through the inner ring 82 and in friction contact with the exterior surface of the tubing string extension 16.

The bow springs 86 extend downwardly to a second mounting ring 102, wherein the bottoms of the bow springs are received in longitudinally-extending slots 104 which also feature transverse grooves 106 to receive the L-shaped ends 108 of the bow springs. A retainer ring 110 circumscribes the mounting ring 102 and is held thereto by one or more set screws (not shown) after the fashion of the set screws 96 illustrated in FIG. 5, to maintain the bow springs 86 locked to the ring assembly including elements 102 and 110. By reference to FIG. 2B, it will be appreciated that the lower mounting ring 102 is loosely fitted about the tubing string extension 16, and is longitudinally movable relative thereto. As the valve 10 is maneuvered within the well bore 12 (see FIG. 1), the bow springs 86 of the drag spring assembly engage the interior surface of the casing 18 and serve to retard movement of the second housing member relative to the casing. The resilient nature of the springs 86 allows the springs to expand or be retracted radially to conform to, and maintain contact with, the casing 18.

It will be appreciated by reference to FIG. 2A that the internal passage 28 of the first housing member 24a and b communicates with the internal passage of the tubular, first valve element 40. However, these passages are prevented from communication with the internal passage 48 of the second housing member 46 by the sealing engagement between the bottom surface 64 of the first valve element 40 and the face seal 62 carried by the second valve element 50. It will further be appreciated by reference to FIGS. 2A and 3 that the latch pins 68 carried by the second housing member 46 are in the upper legs 72a of the latch slot 72 of the first housing member section 24b. Thus, in the configuration illustrated in FIGS. 2A and 3, the first and second valve elements 40 and 50, respectively, are in mutual sealing engagement to prevent fluid communication between the housing passage 28 of the first housing member 24a and b and the internal passage 48 of the second housing member 46.

FIG. 4 illustrates the valve 10 in a second configuration in which the first and second valve elements 40 and 50, respectively, are not in mutual sealing engagement, and whereby the internal passage 28 of the first valve housing may communicate through the first valve element 40, between the lower face 64 of that element and the face seal 62, and through the ports 52 of the second valve element 50 to the internal passage 48 of the second housing member 46. In this configuration of FIG. 4, the latch pins 68 are located within the lower legs 72b of the latch slots 72. Thus, the first and second housing members have been longitudinally mutually separated, causing the washer 36 to engage a downwardly-facing frustoconical shoulder 112 marking the upper limit of the neck 114 of the first valve element 40, lifting that valve element off of the face seal 62 to break the sealing engagement between the first and second valve elements.

In practice, the valve 10, included in a tubing string and tool assembly as illustrated in FIG. 1 for example, may be lowered within a well in the second configuration of FIG. 4 with the first and second valve elements 40 and 50, respectively, not in mutual sealing engagement. Thus, well fluid, for example, may pass through the open valve 10 within the tubing string 16 as the tubing string and valve are lowered within the well.

The tubing string, valve and other tools, if any, are lowered to the depth of interest. Thus, in a wash or acidizing operation, the wash tool such as 14 shown in FIG. 1 is to be positioned at the depth of perforations in the casing 18 at a formation of interest. The valve 10 may then be closed. It will be appreciated that, as the valve is lowered within the casing 18, the bow springs 86 of the drag assembly 80, in retarding the downward movement of the second housing member 46, urge that housing member upwardly relative to the first housing member 24a and b so that the latch pins 68 are maintained in the upper curved portion of the lower latch slot legs 72b (see FIG. 3). With the latch pins 68 thus residing in the curved upper portions of the lower latch legs 72b, the first and second housing members are effectively locked in the second configuration of FIG. 4, with the first and second valve elements locked in unsealed configuration.

With the wash tool 14 at the formation of interest, the tubing string 16 is manipulated at the surface to rotate to the right, being also raised slightly, to release the latch pins 68 from confinement within the lower latch slot legs 72b. Such movement of the tubing string again takes place while the bow springs 86 retard movement of the second housing member 46 relative to the casing 18. Thus, the latch pins 68 are held relatively stationary with respect to the well while the first housing member 24a and b is moved, by manipulation of the tubing string 16, to move the latch slots 72 to position the latch pins in the central portions 72c of the latch slots. The tubing string 16 is then lowered, moving the slots 72 downwardly relative to the latch pins 68, which may then enter the upper legs 72a of the latch slots, being urged thereto by camming action of the slanted upper limits of the central sections 72c of the slots. As the tubing string 16 is thus set down, and the drag spring assembly 80 retards movement of the second housing member 46, the interaction of the latch pins 68 with the beveled upper surfaces of the slots 72 will cause sufficient rotary movement of the second housing member relative to the casing 18 to drive the latch pins into the upper extremities of the upper slot legs 72a, as illustrated in FIGS. 2A and 3. The tubing string may be rotated a few degrees to the left to effect this movement of the pins 68 into the slot legs 72a as well. Thus, manipulation of the tubing string 16 to move the first housing member 24a and b relative to the second housing member 46 results in movement of the housing members from the second position of FIG. 4, wherein the valve 10 is open for fluid communication therethrough, to the first position of FIG. 2A in which the valve is closed.

As the valve 10 is moved into the first configuration of FIG. 2A, the first valve element 40, being held against the washer 36 by the biasing of the compressed spring 42, receives the frustoconical plug end of the second valve element 50. The lower face 64 of the first valve element 40 engages the face seal 62 to initially provide sealing engagement between the first and second valve elements to close the valve 10 against fluid communication therethrough, and is held against the face seal by the spring 42. The first valve element 40 is held against further downward movement by the second valve element 50 and its face seal 62, as the first housing member 24a and b continues its downward movement relative to the second housing member 46 until the latch pins 68 reside in the upper extremities of the latch slot upper legs 72a as illustrated. Thus, the washer 36 is lowered below the level of the valve element shoulder 112. The compressed spring 42 nevertheless maintains the first valve element 40 pressed against the face seal 62 to ensure the sealing engagement between the two valve elements.

The combination of the slidable mounting of the first valve element 40 within the first housing member 24a and b and the downward biasing effect produced by the coil spring 46 enables the first and second housing members to be moved into a rigid locking configuration while still providing a resilient seal engagement between the two valve elements by means of the face seal 62. Thus, the primary seal of the valve 10 by which engagement is made and broken off to close and open the valve selectively does not involve a sliding sealing engagement.

Further, such a resilient seal combination as established by the face seal 62 and the coil spring 42 will nevertheless establish a fluid-tight seal between the bottom face 64 of the first valve element 40 and the seal member when one or the other of these components may become scored or otherwise somewhat damaged say, for example, by flow of well fluids through the open valve. However, the recessed position of the face seal 62 may be expected to protect that seal from such erosion.

The sliding seal provided by the O-ring 45 carried by the first valve element 40 defines the outer radius of the piston head of the first valve element within the tubular passage 28 of the first housing member 24a and b. With the first valve element engaging the face seal 62, fluid pressure within the first housing member passage 28 above the face seal 62 will act on the first valve element 40 as a piston to urge that valve element downwardly into tighter sealing engagement against the face seal 62. Thus, the valve 10 is particularly effective to maintain a fluid-tight closure across the tubing string in the presence of a build-up of fluid pressure within the tubing string above the closed valve.

With the valve 10 closed, fluid pressure may be increased within the tubing string above the closed valve. The wash tool 14, for example, can then be hydraulically set to expand upper and lower seal members 116 and 118, respectively, into sealing engagement with the surrounding casing (see FIG. 1). Continued application of fluid pressure to the interior of the wash tool results in such fluid emerging through one or more ports 120, opened during the setting operating of the wash tool. The fluid will then flow into the annular region within the casing surrounding the wash tool and between the set seal members 116 and 118. Thus, the fluid pressure applied at the surface will now force the fluid emerging from the ports 120 into the perforations 120 through the casing and into the surrounding formation.

Relaxation of the fluid pressure within the tubing string above the valve may effect closure of the ports 120 and release of the seal members 116 and 118 from sealing engagement with the casing 18. The tubing string 16 may then be moved to a different depth within the well for continued operations. The tubing string may be manipulated upwardly without rotation, thus raising the latch slots 72 relative to the latch pins 68 which may be caught in the lower curved portions of the upper latch slot legs 72a. The biasing spring 42 will nevertheless maintain the first valve element 40 in sealing engagement against the face seal 62 of the second valve element in such configuration. Further, the curvature of the latch slot upper legs 72a will maintain the latch pins 68 locked with respect to the second housing member 46 to maintain the valve 10 in the closed configuration. Similarly, the valve 10 would stay closed if the tubing string were moved downwardly, with the latch pins 68 fixed in the upper extremities of the upper latch slot legs 72a, as illustrated in FIG. 3.

The tubing string may be manipulated to open the valve 10. For example, the tubing string may be lowered, rotated to the right and then raised, moving the latch slots 72 so that the latch pins 68 pass out of the upper latch slot legs 72a into the intermediate legs 72c, after which the pins may move to the lower latch slot legs 72b, as the second housing member 46 is cammed to rotate by action of the lower sloped surfaces of intermediate legs 72c. If desired, the tubing string may be rotated to effect the movement of the latch pins 68 into the lower latch slot legs 72b. Thus, manipulation of the tubing string moves the housing members from the first position of FIG. 2A, with the valve closed, to the second position of FIG. 4 with the valve opened.

Figure 6:
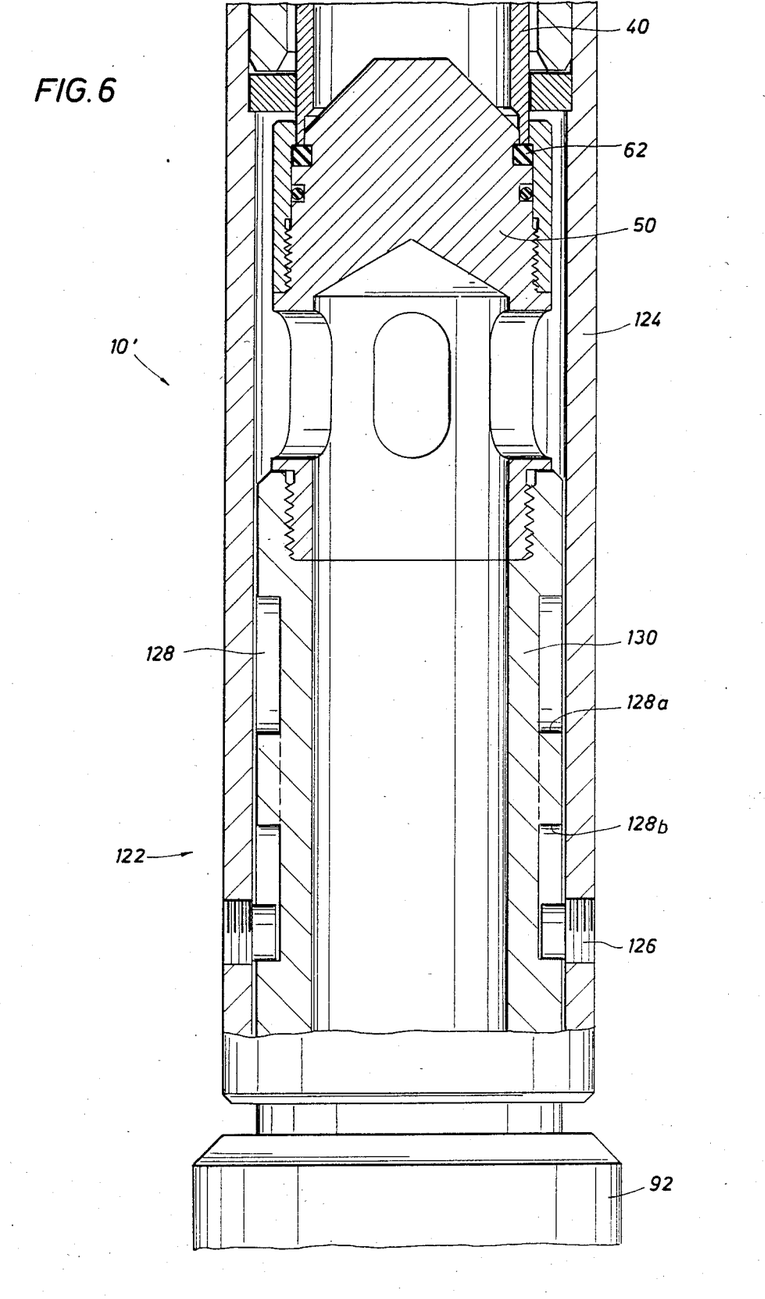
FIG. 6 is an enlarged side elevation in partial section of a portion of another version of a valve according to the present invention, including another embodiment of the latching mechanism.

FIG. 6 illustrates, in part, a valve 10' according to the present invention with a different latch mechanism shown generally at 122. The first housing member 124 extends downwardly and includes one or more latch pins 126 (two are shown) which are threadedly engaged in appropriately-threaded bores through the wall of the first housing member and extend radially inwardly to be received within structured latch slots 128 formed in the outer surface of the second housing member 130. The latch slots 128 are shaped generally as the latch slots 72 of the valve 10, and particularly include an upper leg 128a and a lower leg 128b. In the configuration illustrated in FIG. 6, the valve 10' is closed, with the first valve element 40 sealingly engaging the second valve element 50 at the face seal 62, and with the latch pins 126 located in the lower latch slot legs 128b. To move the valve 10' between the open and closed positions (as shown in FIG. 6), the tubing string is also manipulated. However, it will be appreciated that the tubing string is generally raised to move the latch pins 126 to the upper slot legs 128a to open the valve 10', and lowered to move the pins to the lower slot legs 128b to close the valve. The remaining construction, and the operation, of the valve 10' may be generally the same as that of the valve 10 and will not be further illustrated or described herein.

The present invention provides a tubing closure valve which can be mechanically opened or closed repeatedly, and which responds to increased fluid pressure on the top of the valve by being urged into tighter sealing configuration.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. Valve apparatus for use with a tubular passage comprising:

(a.) a first valve member including a passage therethrough and piston means therein;

(b.) a second valve member comprising a plug and passage means;

(c.) latch means, selectively operable to limit movement of said first and second valve members between a first configuration and a second configuration and to releasably lock said first and second valve members in either said first or second configurations; and (d.) drag means to retard movement of one of said first and second valve members to permit movement of the other of said valve members to effect movement of said valve members between said first and second configurations;

(e.) wherein said first and second valve members may move between, and by said latch means be locked in, said first configuration in which said plug engages said first valve member to close said passage in said first valve member and fluid pressure communicating with said passage urges said first valve member piston means and second valve member into sealing engagement, and said second configuration in which said passage is open and fluid may communicate around said plug through said passage means.

2. Apparatus as defined in claim 1 further comprising biasing means whereby, with said first and second valve members in said first configuration, said valve members are urged into sealing engagement.

3. Apparatus as defined in claim 1 further comprising:

(a) a first housing member carrying said first valve member; and (b) a second housing member carrying said second valve member;

(c) whereby said first and second housing members are mutually movable to effect movement of said first and second valve members between said first and second configurations.

4. Apparatus as defined in claim 3 wherein said latch means includes a first latch member carried by said first housing member and a second latch member carried by said second housing member, whereby said first and second latch members mutually cooperate to limit movement between said first and second housing members, and to releasably lock said first and second housing members against relative movement therebetween when said first and second valve members are in said first configuration and in said second configuration.

5. Apparatus as defined in claim 3 wherein said first valve member piston is sealingly engaged to said first housing member whereby, when said first and second valve members are in said first configuration, fluid pressure within said first housing member urges said first valve member into sealing engagement with said second valve member.

6. Apparatus as defined in claim 5 further comprising biasing means whereby, with said first and second valve members in said first configuration, said valve members are urged into sealing engagement.

7. Apparatus as defined in claim 3 wherein said passage means communicates with the interior of said second housing member whereby, with said first and second valve members in said second configuration, fluid may communicate around said plug of said second valve member and between the interiors of said first and second housing members, and, with said first and second valve members in said first configuration, said fluid communication is prevented by said plug of said second valve member in sealing engagement with said first valve member.

8. Valve apparatus for selectively opening and closing a passage comprising:
   (a) a first housing member defining, at least in part, a passage therethrough, and including a first valve member, said first valve member comprising piston means within said passage of said first housing member, including passage means therethrough for communication with said passage of said first housing member, and being in sliding, sealing engagement with said first housing member; and
   (b) a second housing member defining, at least in part, a passage therethrough for selective communication with said passage of said first housing member, and including a second valve member, said second valve member comprising plug means for closing said passage through said first valve member when said first and second valve members are in a first configuration, thereby interrupting communication between said passage of said first housing member and said passage of said second housing member;
   (c) wherein said first and second housing members may be selectively mutually moved between a first position, in which said first and second valve members may be in said first configuration, and a second position, in which said first and second valve members are in a second configuration wherein said passage of said first housing member may be in communication with said passage of said second housing member;
   (d) latch means for limiting mutual movement of said first and second housing members between said first and second positions, and for releasably locking said first and second housing members in said first and second positions; and
   (e) resistance means tending to maintain one of said first or second housing members relatively stationary while the other of said housing members is moved to permit relative movement of said first and second housing members between said first and second positions.

9. Apparatus as defined in claim 8 wherein, when said first and second housing members are in said first position, fluid pressure within said passage of said first housing member may urge said first valve member into sealing engagement with said second valve member.

10. Apparatus as defined in claim 9 further comprising bias means included in said first housing member for urging said first valve member into sealing engagement with said second valve member when said first and second housing members are in said first position.

11. Apparatus as defined in claim 8 further comprising bias means included in said first housing member for urging said first valve member into sealing engagement with said second valve member when said first and second housing members are in said first position.

12. A valve assembly for selectively closing a tubing passage, comprising;
   (a) tubular housing means including a passage therethrough for communication with said tubing passage, further comprising a first housing member and a second housing member selectively mutually movable between a first configuration and a second configuration;
   (b) latch means for limiting said mutual movement between said first and second housing members and for releasably locking said housing members in said first and second configurations;
   (c) first valve means comprising a generally tubular piston in slidable sealing engagement with said first housing member, and including a passage therethrough for communication with said passage through said housing means;
   (d) second valve means included in said second housing member and comprising plug means;
   (e) seal means carried by one or the other of said first and second valve means; and
   (f) resistance means, including at least one drag spring, carried by one or the other of said first and second housing members for impeding movement of said housing member carrying said resistance means during selective movement of the other of said housing members to permit movement of said first and second housing members between said first and second configurations;
   (g) whereby, when said first and second housing members are in said first configuration said seal means provides sealing engagement between said first valve means and said second valve means which closes said passage through said first valve means to thereby close said passage through said housing means and said tubing, and when said first and second housing members are in said second configuration said first and second valve means are mutually separated to allow communication through said passage of said first valve means.

13. Apparatus as defined in claim 12 wherein, when said first and second housing members are in said first configuration, fluid pressure in communication with said tubing passage urges said valve means into sealing engagement with said second valve means.

14. Apparatus as defined in claim 13 further comprising bias means included in said first housing member for urging said first valve means into sealing engagement with said second valve means when said first and second housing members are in said first configuration.

15. Apparatus as defined in claim 12 further comprising bias means included in said first housing member for urging said first valve means into sealing engagement with said second valve means when said first and second housing members are in said first configuration.

* * * * *